March 8, 1966 B. LAZARD 3,239,310
PROCESS FOR ENRICHING AMMONIA IN DEUTERIUM
Filed Dec. 7, 1961 4 Sheets-Sheet 1

INVENTOR
BERTRAND LAZARD
BY
Bacon & Thomas
ATTORNEYS

United States Patent Office
3,239,310
Patented Mar. 8, 1966

3,239,310
PROCESS FOR ENRICHING AMMONIA
IN DEUTERIUM
Bertrand Lazard, Paris, France, assignor to Commissariat
à l'Energie Atomique, and Houilleres du Bassin du
Nord et du Pas-de-Calais, and Compagnie de Construction Mecanique Procedes Sulzer, and l'Air Liquide:
Societe Pour l'Etude et l'Exploitation des Procedes
George Claude
Filed Dec. 7, 1961, Ser. No. 157,670
Claims priority, application France, Dec. 14, 1960,
846,861
3 Claims. (Cl. 23—193)

The preparation of heavy water by isotopic monothermic ammonia-hydrogen exchange is a known method which has the advantage of simplicity, but one of the major disadvantages is that as the ammonia does not flow in a closed cycle, it is necessary to recover the dissolved catalyst, in this case an amide of alkali metal. A second disadvantage is that as the molecule of the soluble catalyst contains hydrogen, its deuterium content will vary at the same time as that of the ammonia. The recycling of the catalyst can then give rise to a mixture of two substances having very different deuterium contents, which can result in unfavourable effects on the characteristics of the isotopic exchange installation, in particular on the deuterium yield.

In French patent application dated June 8, 1959, for "Improvement to Processes of Preparation of Heavy Water by Monothermic $NH_3=H_2$ Isotopic Exchange," which corresponds to U.S. application Serial No. 34,268, means for partially obviating these consequences were indicated, being characterised in that at least one catalyst reinjection circuit was provided, each circuit being connected to at least one of the reactors of isotopic exchange between liquid ammonia and hydrogen and, in a first fraction of a number of these circuits, the catalyst leaving a first fraction of the number of the reactors was dried before being reinjected into the ammonia at the heads of the reactors, whereas in the second fraction of the number of these circuits the catalyst solution leaving a second fraction of the number of the reactors was concentrated and this concentrated solution was passed in countercurrent relation to a mixture of ammonia synthesis gas tapped at the outlet of the second fraction of the number of the reactors, said concentrated solution and said gaseous mixture being subsequently reinjected into the second fraction of the number of the reactors, respectively at the head of the ammonia supply and near to a deuterium concentration point.

FIGURES 1 and 2 show in diagrammatic form two embodiments of these known catalyst reinjection circuits.

In FIGURES 1 and 2, the monothermic isotopic exchange installation comprises two exchange reactor assemblies, 1 and 2, a unit 3 transforming the ammonia into synthesis gas having a ratio of three molecules of hydrogen to one molecule of nitrogen and serving the purpose of supplying the gaseous reflux to the reactor assembly 2 and an ammonia synthesis unit 4 providing the liquid reflux at the head of the reactor assembly 1. This installation is supplied with ammonia synthesis gas at intake 5, the deuterium-containing fraction being drawn off through line 6 in the form of enriched ammonia and the rejected fraction being drawn off through line 7 in the form of ammonia poor in deuterium.

In FIGURE 1, the catalyst solution leaving the reactor assembly 2 is delivered and dried in evaporator 8. The catalyst is then reinjected at 9 into the ammonia which supplied the reactor assembly 1. The ammonia evaporated by the evaporator 8 is delivered to device 3, the enriched ammonia being drawn off through line 6 as stated above.

In FIGURE 2, parts similar to those of FIGURE 1 have been given the same reference. The recovery of the catalyst is carried out by evaporating a fraction of the enriched ammonia from the bottom of the reaction assembly 2 in evaporator 8. This fraction freed of the catalyst is delivered to unit 3, the enriched ammonia being drawn off through line 6; the non-evaporated ammonia and the catalyst which is now concentrated are delivered to a third reactor assembly 10 where they are impoverished by counter-current exchange with synthesis gas poor in deuterium, which has been drawn off from the top of the reactor assembly 1, before being reinjected at 9 into the ammonia poor in deuterium entering into this reactor assembly. The synthesis gas leaving the reactor assembly 10 is returned to assembly 2 at a suitable point 11 of the installation.

In the first embodiment, the total deuterium production of the installation is represented by the enriched ammonia drawn off at 6, and by the quantity carried off by the deuterium-enriched catalyst. In the second embodiment of the total deuterium production is represented by the enriched ammonia drawn off at 6, by the deuterium-enriched catalyst, and also by the ammonia which dissolves from this diminished catalyst the quantity of deuterium contained in the washing gas passing through reactor assembly 10, and reinjected at 11 into reactor assembly 2.

It is known that for an isotopic exchange system to have greater production, it must have greater size and expenditure in energy. Now, the solubility limit of the catalyst in liquid ammonia imposes in the second case, a considerable withdrawing of enriched liquid and thus, to some extent, parasitical production cannot be entirely compensated by the reinjection of gas at 11 for two reasons: firstly, the deuterium yield of the reactor assembly 10 cannot reach 100% for the catalyst solution reinjected at 9 still contains a considerable quantity of deuterium, and secondly as a result of the existence of the separation coefficient between the hydrogen and the ammonia, the deuterium content of the gas reinjected at 11 will be below that of the ammonia withdrawn at 8.

In order to reduce these effects as far as possible, it is necessary to provide a reactor assembly 10 containing a large number of theoretical contacts. On the other hand, in order to be able to reinject the gas at 11 as close as possible to the lower part of the reactor assembly 2, it is advisable to decrease the separation coefficient between the hydrogen and the ammonia, that is to say to operate reactor assembly 10 at high temperatures. The immediate drawback resulting therefrom is an increased expenditure of energy for the saturation by ammonia vapour of the gas entering assembly 10 and the condensation of the ammonia vapour contained in this gas before its reinjection at 11.

The case in which the catalyst is dried before being reinjected into the reactor assembly 1 does not have these drawbacks but, on the other hand, it makes it impossible to removed a large part of the deuterinum contained in this catalyst before it is reinjected into assembly 1, which may be prejudicial to the yield of the installation as a result of the mixture of ammonia poor in deuterium leaving at 4 and of the catalyst rich in deuterium which is reinjected thereinto.

The present invention has for an object to reduce these drawbacks.

The invention consists in a process for the preparation of heavy water by isotopic monothermic ammonia-hydrogen exchange in one or more reactors between liquid ammonia and hydrogen containing deuterium, in the presence of a catalyst in solution in liquid ammonia, circulating cyclically in said reactor or reactors, at least one catalyst reinjection circuit being provided and being connected to at least one of the reactors and in each circuit the catalyst leaving the reactors being delivered in a dry condition, the catalyst being redissolved in a part of the ammonia supplying the tops of the reactors in order to form a concentrated solution which is passed in counter-current relation with a mixture of ammonia synthesis gas tapped at its outlet to the reactors, said concentrated solution being subsequently reinjected into the other part of the ammonia supply of the reactors, and said gaseous mixture being reinjected near to a deuterium concentration point.

The parasitical production at the base of each fraction of the reactor assembly is thus much reduced since it is reduced to that of the dry catalyst and it is possible to eliminate the major part of the deuterium contained in the solution before reinjection into the ammonia poor in deuterium by washing in counter-current relation with a gas poor in deuterium. As the mixture of the deuterium-rich catalyst and deuterium-poor ammonia has a much weaker deuterium concentration than a concentrated solution withdrawn directly at the base of reactor assembly 2, all other things being equal, the reactor assembly 10 can be greatly reduced or, if the same reactor assembly is retained, the temperature of this assembly can be lower than in the first case.

Two embodiments of the invention will now be described with reference to FIGURES 3 and 4 of the accompanying drawings.

Figure 1:
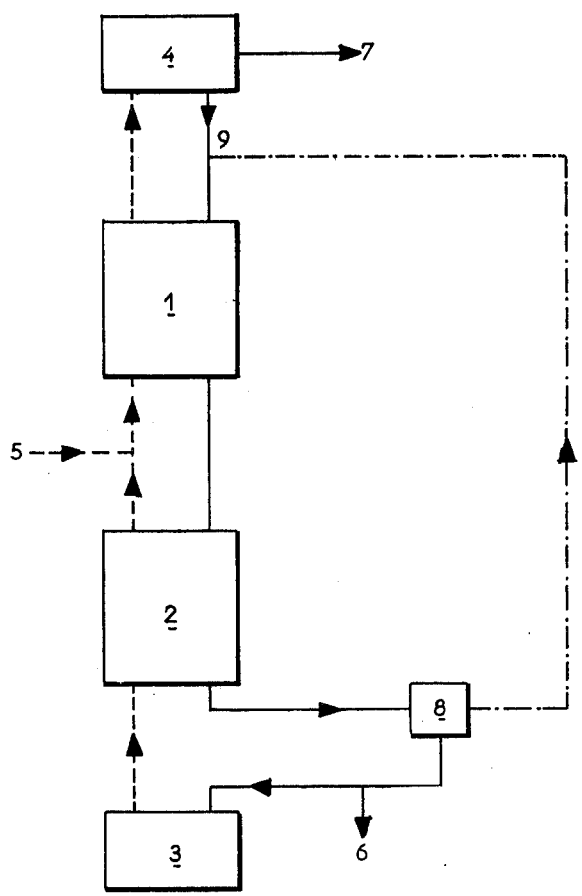
Figure 2:
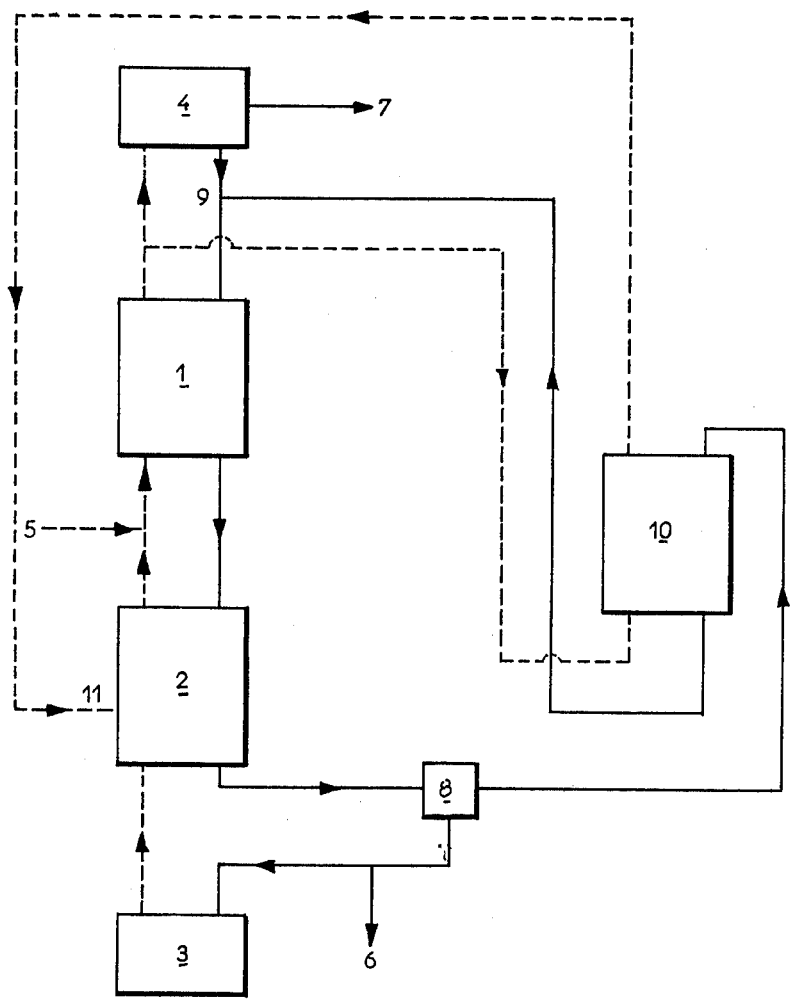

In these figures only the parts necessary for the understanding of the invention are shown, and similar parts in the figures have the same reference numerals. In particular, with a view to simplification of the diagrams, the parts causing the liquid and gas circulations, and the heat exchangers and so on are not shown.

Figure 3:
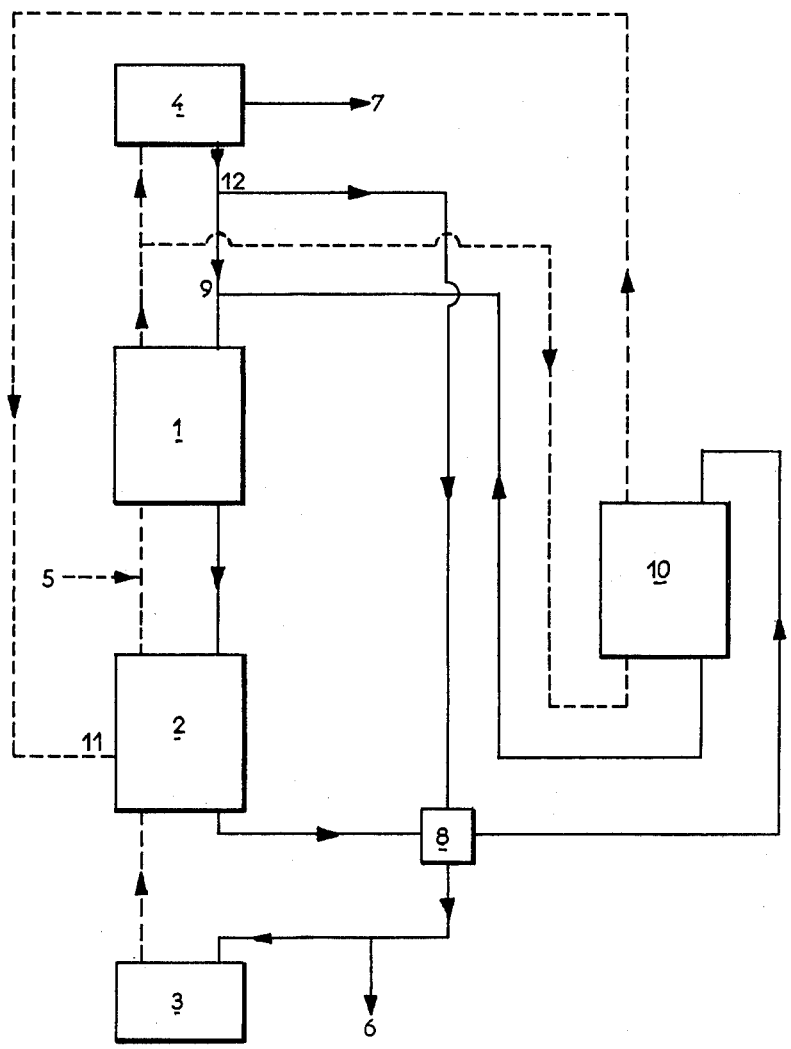
FIGURE 3 is a diagram of an arrangement according to the invention in which a catalyst reinjecton circuit comprising an evaporator and an auxiliary reactor assembly is connected to two reactor assemblies.

Referring to FIGURE 3, two reactor assemblies 1 and 2 will be seen, also a unit 3 transforming the ammonia into synthesis gas, and an ammonia synthesis unit 4. The installation is supplied with ammonia synthesis gas at intake 5, the deuterium-containing fraction being drawn off through line 6 in the form of enriched ammonia and the rejected fraction being drawn off through line 7 in the form of ammonia poor in deuterium. In evaporator 8 the dry catalyst is produced from the high deuterium containing solution from the bottom of reactor assembly 2. The ammonia which has been evaporated and freed from the catalyst is delivered to unit 3. The catalyst is redissolved in a fraction, tapped from synthesis unit 4 at point 12, of ammonia poor in deuterium used to supply reactor assembly 1. This solution is delivered to a third auxiliary reactor assembly 10 where it is impoverished in deuterium by exchange with gas withdrawn at the top of assembly 1, and is then reinjected at 9 into another fraction of ammonia, thus being added to the supply of reactor assembly 1. The synthesis gas leaving the auxiliary reactor assembly 10 is reinjected at a suitable point of the installation, for example into reactor assembly 2 at point 11.

Figure 4:
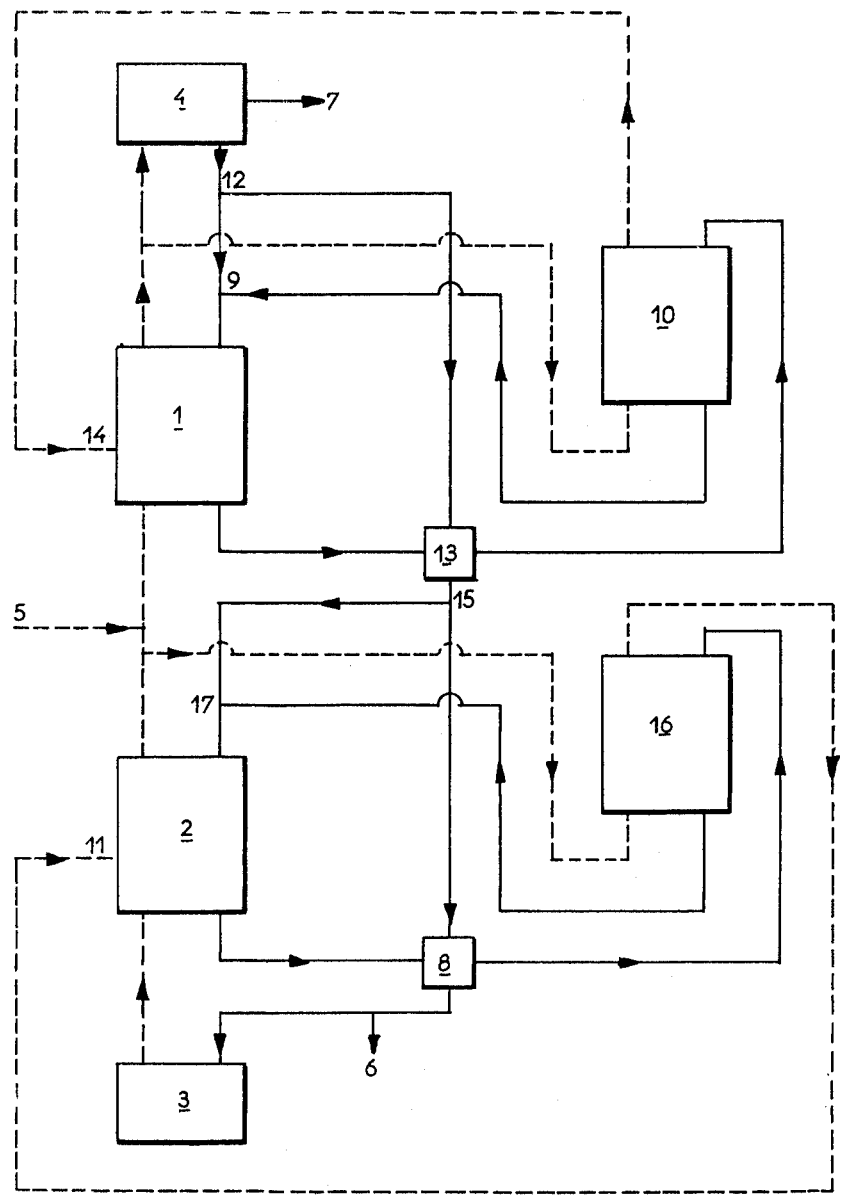
FIGURE 4 is a diagram of an alternative arrangement according to the invention in which two catalyst reinjection circuits each comprising an evaporator and an auxiliary reactor assembly are connected to two reactor assemblies.

The embodiment shown in FIGURE 4 has an evaporator 13 to which the catalyst contained in the ammonia leaving the reactor assembly 1 is produced in a dry condition. Ammonia evaporated and freed of the catalyst is delivered to the head of reactor assembly 2. The catalyst is redissolved in a fraction, tapped at from synthesis unit 4 at point 12, of ammonia used to supply reactor assembly 1. This solution is delivered to a reactor assembly 10 where it is impoverished in deuterium by exchange with a gas withdrawn from the top of reactor assembly 1 before being reinjected at 9 into the other fraction of ammonia, thus being added to the supply of reactor assembly 1. The synthesis gas leaving reactor 10 is reinjected at a suitable point of the installation, for example into assembly 1 at point 14.

The catalyst contained in the ammonia leaving reactor assembly 2 is brought into evaporator 8 and dried. The ammonia which has been evaporated and freed of the catalyst is delivered to unit 3. The catalyst is redissolved in an ammonia fraction tapped from evaporator 13 at 15, supplying the reactor assembly 2. This solution is delivered to a reactor assembly 16 where it is impoverished in deuterium in exchange with the synthesis gas withdrawn from the top of assembly 2 before being reinjected at 17 into the other fraction of ammonia, thus being added to the supply of assembly 2. The synthesis gas leaving the reactor assembly 16 is reinjected at a suitable point in the installation, for example into the reactor assembly 2 at point 11.

I claim:

1. A process for enriching ammonia in deuterium, comprising flowing liquid ammonia of low deuterium content having a body of an alkali metal amide catalyst dissolved therein along a first path in contact with synthesis gas comprising hydrogen containing deuterium capable of being transferred to said liquid ammonia in the presence of said catalyst whereby the liquid ammonia becomes enriched in deuterium in a terminal portion of said first path, evaporating the liquid ammonia from said terminal portion of said first path to dry said catalyst and separate it from said ammonia enriched in deuterium, injecting said dry catalyst into a portion of said liquid ammonia of the low deuterium content entering said first contact path to form a concentrated solution, passing said concentrated solution in a second path in contact with synthesis gas comprising hydrogen or relatively low deuterium content from an initial portion of said first contact path to reduce materially the deuterium content of said concentrated solution, injecting said concentrated solution of reduced deuterium content into said first path of liquid ammonia at a point of low deuterium concentration and injecting said synthesis gas into said first gas contact path at a point of deuterium concentration similar to said gas, whereby the amount of deuterium recycled with the catalyst is reduced.

2. A process according to claim 1 in which the synthesis gas contains hydrogen and nitrogen in a ratio of 3 moles of hydrogen to 1 mole of nitrogen.

3. A process according to claim 1 in which the first contact path includes a plurality of contact stages and the liquid ammonia from the terminal portion of at least one of said stages is removed and subjected to said drying, dissolution in ammonia, exchange with synthesis gas and injection procedures in a second path.

References Cited by the Examiner

UNITED STATES PATENTS

| 2,741,543 | 4/1956 | Urey | 23—204 |
| 2,787,526 | 4/1957 | Spevack | 23—204 |
| 2,988,428 | 6/1961 | Hesky | 23—204 |

FOREIGN PATENTS

| 1,046,590 | 12/1958 | Germany. |
| 807,803 | 1/1959 | Great Britain. |

BENJAMIN HENKIN, *Primary Examiner.*

MAURICE A. BRINDISI, *Examiner.*

E. C. THOMAS, *Assistant Examiner.*